US012762959B2

(12) United States Patent
Nguyen

(10) Patent No.: US 12,762,959 B2
(45) Date of Patent: Oct. 13, 2026

(54) DETERMINING A FUEL SCHEDULE FOR A MULTI-FUEL AIRCRAFT ENGINE

(71) Applicant: Pratt & Whitney Canada Corp., Longueuil (CA)

(72) Inventor: Kevin Nguyen, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/815,242

(22) Filed: Aug. 26, 2024

(65) Prior Publication Data

US 2026/0057787 A1 Feb. 26, 2026

(51) Int. Cl.

| | |
|---|---|
| ***G08G 5/00*** | (2025.01) |
| ***B64F 1/28*** | (2006.01) |
| ***F02C 7/22*** | (2006.01) |
| ***G06Q 10/0832*** | (2023.01) |
| ***G06Q 10/109*** | (2023.01) |
| ***G06Q 10/1093*** | (2023.01) |
| ***G08G 5/32*** | (2025.01) |

(52) U.S. Cl.

CPC ................ *G08G 5/32* (2025.01); *B64F 1/28* (2013.01); *F02C 7/22* (2013.01); *G06Q 10/0832* (2013.01); *G06Q 10/1097* (2013.01)

(58) Field of Classification Search

CPC .... G08G 5/32; B64F 1/28; F02C 7/22; G06Q 10/0832; G06Q 10/1097

See application file for complete search history.

(56) References Cited

U.S. PATENT DOCUMENTS

| | | | | |
|---|---|---|---|---|
| 8,554,460 | B2 * | 10/2013 | Struzik | .................... G07C 5/08 701/123 |
| 11,739,700 | B2 * | 8/2023 | Swann | .................. B64D 37/30 60/776 |
| 11,815,031 | B2 * | 11/2023 | Swann | ...................... F02C 9/28 |
| 11,900,281 | B2 | 2/2024 | De Oliveira | |
| 2011/0101166 | A1 | 5/2011 | Schwarze | |

(Continued)

FOREIGN PATENT DOCUMENTS

| | | | | |
|---|---|---|---|---|
| FR | 3130760 A1 * | 6/2023 | ............ | B64D 37/30 |

OTHER PUBLICATIONS

EP Search Report for EP Patent Application No. 25198272.4 dated Jun. 10, 2026.

*Primary Examiner* — Peter D Nolan
*Assistant Examiner* — Demetra R Smith-Stewart
(74) *Attorney, Agent, or Firm* — Getz Balich LLC

(57) ABSTRACT

A method is provided for operating an aircraft. During this operating method, a flight plan is received for an aircraft. The flight plan schedules a flight for the aircraft to fly from a first airport to a second airport. The aircraft includes an engine and a fuel delivery system with a first fuel reservoir and a second fuel reservoir. The fuel delivery system is configured to selectively deliver a first fuel from the first fuel reservoir and/or a second fuel from the second fuel reservoir to the engine for combustion. The first fuel reservoir contains a quantity of the first fuel and the second fuel reservoir contains a quantity of the second fuel at the first airport. A fuel schedule for the aircraft is determined to use during the flight. The fuel schedule is determined based on whether the second airport includes refueling capability for the first fuel and/or the second fuel.

20 Claims, 5 Drawing Sheets

(56) References Cited

U.S. PATENT DOCUMENTS

| | | | | |
|---|---|---|---|---|
| 2013/0075532 | A1* | 3/2013 | Fuscone | B64F 1/28 244/135 A |
| 2015/0279218 | A1* | 10/2015 | Irrgang | G08G 5/58 701/3 |
| 2016/0031565 | A1* | 2/2016 | Mohan | B64D 37/26 701/3 |
| 2021/0103860 | A1 | 4/2021 | De Oliveira | |
| 2022/0316410 | A1* | 10/2022 | Swann | B64D 27/33 |
| 2023/0340915 | A1 | 10/2023 | Speak | |
| 2023/0356995 | A1* | 11/2023 | Dahl | B67D 7/08 |
| 2024/0199230 | A1 | 6/2024 | Ribeiro | |

* cited by examiner

DETERMINING A FUEL SCHEDULE FOR A MULTI-FUEL AIRCRAFT ENGINE

TECHNICAL FIELD

This disclosure relates generally to an aircraft and, more particularly, to scheduling fuel use for a multi-fuel engine of the aircraft.

BACKGROUND INFORMATION

An aircraft may include an engine capable of using multiple different fuels. Various systems and methods are known in the art for delivering fuels to such a multi-fuel engine. While these known fuel delivery systems and methods have various benefits, there is still room in the art for improvement.

SUMMARY

According to an aspect of the present disclosure, a method is provided for operating an aircraft. During this operating method, a flight plan is received for an aircraft. The flight plan schedules a flight for the aircraft to fly from a first airport to a second airport. The aircraft includes an engine and a fuel delivery system with a first fuel reservoir and a second fuel reservoir. The fuel delivery system is configured to selectively deliver a first fuel from the first fuel reservoir and/or a second fuel from the second fuel reservoir to the engine for combustion. The first fuel reservoir contains a quantity of the first fuel and the second fuel reservoir contains a quantity of the second fuel at the first airport. A fuel schedule for the aircraft is determined to use during the flight. The fuel schedule is determined based on whether the second airport includes refueling capability for the first fuel and/or the second fuel.

According to another aspect of the present disclosure, another method is provided for operating an aircraft. During this operating method, a flight plan is received for an aircraft. The flight plan schedules a flight for the aircraft to fly non-stop from a first airport to a second airport. The aircraft includes a fuel delivery system and an engine. The fuel delivery system includes a first fuel reservoir and a second fuel reservoir. The fuel delivery system is configured to selectively deliver a first fuel from the first fuel reservoir and/or a second fuel from the second fuel reservoir to the engine for combustion. The first fuel has a first density. The second fuel has a second density that is less than the first density. A fuel schedule for the aircraft is determined to use during the flight. The fuel schedule is determined based on a maximum landing weight of the aircraft. When a predicted weight of the aircraft during landing at the second airport following use of the second fuel without the first fuel during the flight is equal to or less than the maximum landing weight, the fuel schedule schedules use of the second fuel without the first fuel during the flight. When the predicted weight of the aircraft during the landing at the second airport following use of the second fuel without the first fuel during the flight is greater than the maximum landing weight, the fuel schedule schedules use of the second fuel and the first fuel during the flight.

According to still another aspect of the present disclosure, another method is provided for operating an aircraft. During this operating method, a system is provided for an aircraft. This aircraft system includes an aircraft engine, a fuel delivery system and a processing system. The fuel delivery system includes a first fuel reservoir and a second fuel reservoir. The fuel delivery system is configured to selectively deliver a first fuel from the first fuel reservoir and/or a second fuel from the second fuel reservoir to the engine for combustion. The processing system is configured to determine a fuel schedule for the aircraft to use during a flight from a first airport to a second airport where the first fuel reservoir contains a quantity of the first fuel and the second fuel reservoir contains a quantity of the second fuel at the first airport. The processing system determines the fuel schedule based on whether the second airport includes refueling capability for the first fuel and/or the second fuel.

One of the first fuel or the second fuel may be or otherwise include a hydrocarbon fuel. The other one of the first fuel or the second fuel may be or otherwise include a non-hydrocarbon fuel.

One of the first fuel or the second fuel may be or otherwise include a kerosene fuel.

One of the first fuel or the second fuel may be or otherwise include a hydrogen ($H_2$) fuel.

One of the first fuel or the second fuel may be or otherwise include sustainable aviation fuel.

The fuel schedule may schedule use of the first fuel during the flight where the second airport does not include the refueling capability for the second fuel.

The fuel schedule may schedule no use of the second fuel during the flight.

The flight plan may identify a flightpath for the aircraft to follow during the flight from the first airport to the second airport. The fuel schedule may also be determined based on an emissions standard for an airspace along the flightpath. The fuel schedule may also schedule use of the second fuel during the flight through the airspace where operation of the engine using the first fuel does not meet the emissions standard for the airspace and operation of the engine using the second fuel does meet the emissions standard for the airspace.

The airspace may be an airspace at the first airport or the second airport.

The airspace may be an intermediate airspace located along the flightpath between a first airport airspace at the first airport and a second airport airspace at the second airport.

The second fuel may be or otherwise include a non-hydrocarbon fuel or a sustainable aviation fuel.

The first fuel may be or otherwise include a kerosene fuel. The second fuel may be or otherwise include a non-hydrocarbon fuel or a sustainable aviation fuel. The fuel schedule may schedule use of the second fuel during the flight where the second airport includes the refueling capability for both the first fuel and the second fuel.

The fuel schedule may schedule no use of the first fuel during the flight.

The fuel schedule may also schedule use of the first fuel during the flight where a range for operating the engine on the second fuel contained within the second fuel reservoir at the first airport is less than a distance the aircraft travels during the flight.

The first fuel may have a first density. The second fuel may have a second density that is less than the first density. The fuel schedule may also schedule use of the first fuel during the flight where a weight of the aircraft during landing at the second airport is predicted to be greater than a maximum landing weight of the aircraft if the engine was fueled only with the second fuel during the flight.

The first fuel may be configured as or otherwise include a kerosene fuel. The second fuel may be configured as or otherwise include a non-hydrocarbon fuel. The fuel schedule may schedule use of one of (a) only the second fuel or (b) all of the second fuel and some of the first fuel during the flight where the aircraft is scheduled to remain on ground at the second airport for a period of time equal to or greater than a threshold.

The fuel schedule may be determined using a processing system off-board the aircraft.

The fuel schedule may be determined using a processing system onboard the aircraft.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
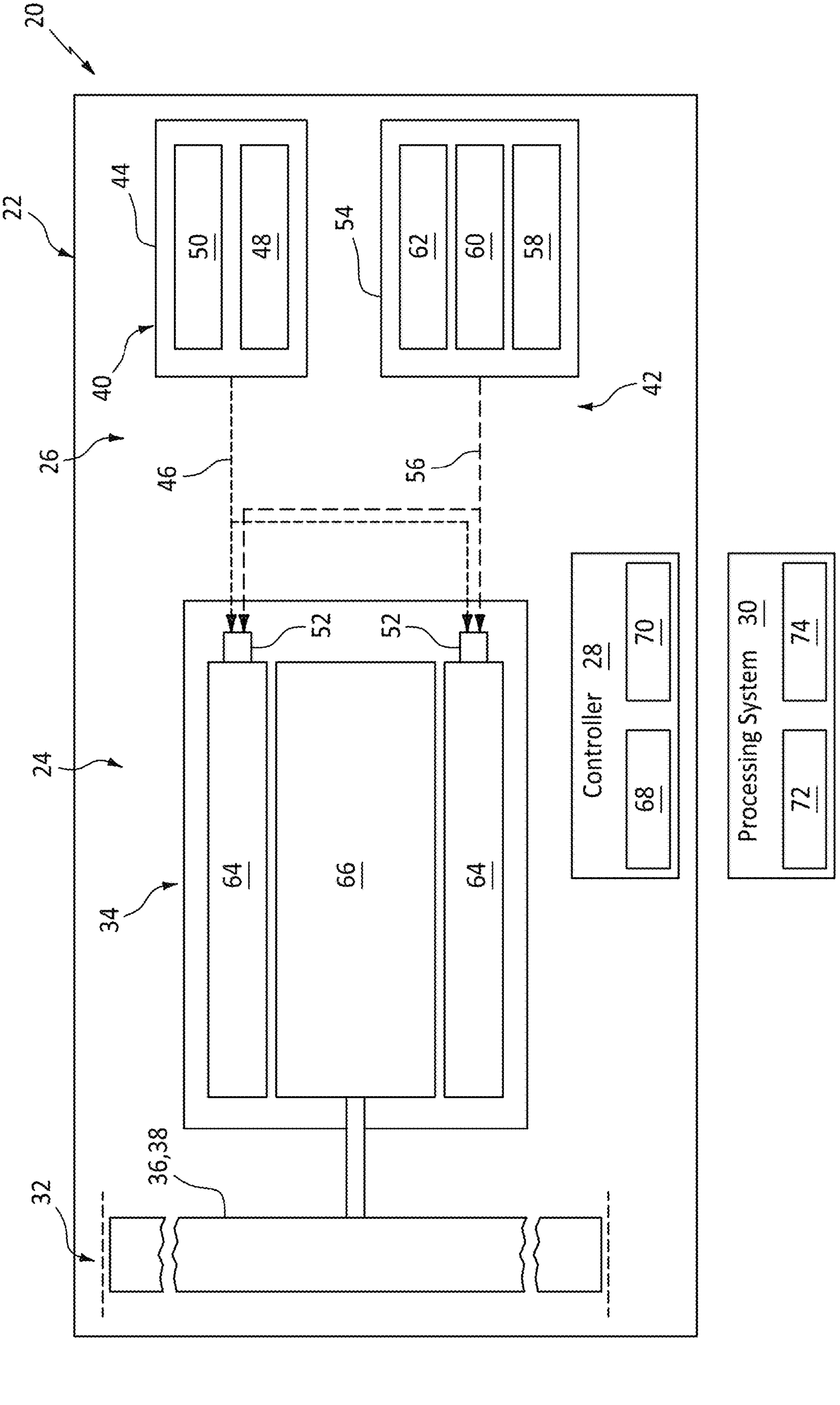
FIG. 1 is a schematic illustration of a system for an aircraft.

FIG. 1 illustrates a system 20 for an aircraft. The aircraft 22 may be an airplane, a helicopter, a drone (e.g., an unmanned aerial vehicle (UAV)) or any other manned or unmanned aerial vehicle or system. The aircraft system 20 includes an aircraft powerplant 24, a fuel delivery system 26 for the aircraft powerplant 24, and a controller 28 for the aircraft powerplant 24 and the fuel delivery system 26. The aircraft powerplant 24, the fuel delivery system 26 and the controller 28 are located onboard and are included as part of the aircraft 22. The aircraft system 20 also includes a processing system 30; e.g., a computer system or network of computers. For ease of description, the processing system 30 is described below as being located remote from/off-board of the aircraft 22. The processing system 30, for example, may be located at an airport terminal, an aircraft flight scheduling office, or the like. It is contemplated, however, the processing system 30 may alternatively be located onboard and included as part of the aircraft 22. In such embodiments where the processing system 30 is onboard the aircraft 22, the processing system 30 may be arranged in communication with the controller 28 or alternatively the processing system 30 may be configured as part of/integrated into the controller 28.

The aircraft powerplant 24 may be configured as, or included as part of, a propulsion system for the aircraft 22. The aircraft powerplant 24 may also or alternately be configured as, or included as part of, an electrical power system for the aircraft 22; e.g., an auxiliary power unit (APU) system. The aircraft powerplant 24 of FIG. 1 includes a mechanical load 32 and an aircraft engine 34 configured to power operation of the mechanical load 32.

The mechanical load 32 may be configured as or otherwise include a rotor 36 mechanically driven by the aircraft engine 34. This driven rotor 36 may be a bladed propulsor rotor 38 for the aircraft propulsion system. The propulsor rotor 38 may be a ducted propulsor rotor or an open propulsor rotor; e.g., an un-ducted propulsor rotor. An example of the ducted propulsor rotor is a ducted fan rotor. Examples of the open propulsor rotor include a propeller rotor, a rotorcraft rotor (e.g., a main helicopter rotor), a propfan rotor and a pusher fan rotor. Alternatively, the driven rotor 36 may be configured as a generator rotor of an electric power generator for the aircraft electrical power system. The present disclosure, however, is not limited to the foregoing exemplary mechanical loads and driven rotors. However, for ease of description, the aircraft powerplant 24 may be described below as the aircraft propulsion system, and the driven rotor 36 may be described below as the propulsor rotor 38.

The aircraft engine 34 is an internal combustion engine configured to drive rotation of the propulsor rotor 38—the driven rotor 36. This internal combustion engine may be a continuous combustion engine or an intermittent combustion engine. An example of the continuous combustion engine is a gas turbine engine such as a turbofan engine, a turboprop engine, a turboshaft engine and a turbojet engine. Examples of the intermittent combustion engine include a rotary engine (e.g., a Wankel engine) and a reciprocating piston engine. The present disclosure, however, is not limited to the foregoing exemplary internal combustion engines. Moreover, it is contemplated the aircraft engine 34 may be a hybrid engine which includes one or more electric machines: e.g., electric motor(s), electric generator(s) and/or motor-generator(s).

The fuel delivery system 26 is configured to deliver at least (or only) two fuels to the aircraft powerplant 24 and its aircraft engine 34. For ease of description, the two fuels may be described below as a hydrocarbon fuel (HF) and a non-hydrocarbon fuel (NHF). Examples of the hydrocarbon fuel include a kerosene fuel (e.g., a Jet A fuel), a propane fuel, a methane fuel (e.g., a natural gas fuel) and a sustainable aviation fuel (SAF). Examples of the sustainable aviation fuel include fuels produced using material(s) such as, but not limited to, corn grain, oil seeds, algae, fats, oils, greases, agricultural residue, forestry residue, wood mill waste, municipal solid waste streams, wet wastes (e.g., manure, wastewater treatment sludge, etc.) and dedicated energy crops. An example of the non-hydrocarbon fuel is hydrogen ($H_2$) fuel; e.g., liquid hydrogen or hydrogen gas. With such exemplary fuels, the hydrocarbon fuel may be denser than the non-hydrocarbon fuel. The present disclosure, however, is not limited to the foregoing exemplary hydrocarbon and non-hydrocarbon fuel types. Moreover, it is contemplated the two fuels may alternatively both be a hydrocarbon fuel or a non-hydrocarbon fuel. For example, one of the fuels may be a traditional hydrocarbon fuel such as the kerosene fuel, whereas the other one of the fuels may be a non-traditional hydrocarbon fuel such as the sustainable aviation fuel.

The fuel delivery system 26 of FIG. 1 includes a hydrocarbon fuel system 40 and a non-hydrocarbon fuel system 42 where, for example, the two fuels are the exemplary hydrocarbon and non-hydrocarbon fuels.

The hydrocarbon fuel system 40 includes a hydrocarbon fuel source 44 and a hydrocarbon fuel circuit 46. The hydrocarbon fuel source 44 of FIG. 1 includes a hydrocarbon fuel reservoir 48 and a hydrocarbon fuel flow regulator 50. The hydrocarbon fuel reservoir 48 is configured to store a quantity of the hydrocarbon fuel before, during and/or after aircraft powerplant operation. The hydrocarbon fuel reservoir 48, for example, may be configured as or otherwise include a tank, a cylinder, a pressure vessel, a bladder or any other type of fuel storage container. The hydrocarbon fuel flow regulator 50 is configured to direct a flow of the hydrocarbon fuel from the hydrocarbon fuel reservoir 48, through the hydrocarbon fuel circuit 46, to one or more fuel injectors 52 of the aircraft engine 34. The hydrocarbon fuel flow regulator 50, for example, may be configured as or otherwise include a fuel compressor, a fuel pump and/or a fuel valve (or valve system).

The non-hydrocarbon fuel system 42 includes a non-hydrocarbon fuel source 54 and a non-hydrocarbon fuel circuit 56. The non-hydrocarbon fuel source 54 of FIG. 1 includes a non-hydrocarbon fuel reservoir 58, a non-hydrocarbon fuel flow regulator 60 and a non-hydrocarbon fuel evaporator 62. The non-hydrocarbon fuel reservoir 58 is configured to store a quantity of the non-hydrocarbon fuel (e.g., in its liquid phase) before, during and/or after aircraft powerplant operation. The non-hydrocarbon fuel reservoir 58, for example, may be configured as or otherwise include a tank, a cylinder, a pressure vessel, a bladder or any other type of (e.g., insulated) fuel storage container. The non-hydrocarbon fuel flow regulator 60 is configured to direct a flow of the non-hydrocarbon fuel (e.g., in its liquid phase) from the non-hydrocarbon fuel reservoir 58, sequentially through the non-hydrocarbon fuel evaporator 62 and the non-hydrocarbon fuel circuit 56, to the one or more fuel injectors 52. The non-hydrocarbon fuel flow regulator 60, for example, may be configured as or otherwise include a fuel compressor, a fuel pump and/or a fuel valve (or valve system). The non-hydrocarbon fuel evaporator 62 is configured to facilitate evaporation of the non-hydrocarbon fuel from its liquid phase to a gaseous phase such that the gaseous non-hydrocarbon fuel is directed through the non-hydrocarbon fuel circuit 56 to the fuel injectors 52.

For ease of description, the hydrocarbon fuel system 40 and the non-hydrocarbon fuel system 42 may be described herein as delivering both the hydrocarbon fuel and the non-hydrocarbon fuel (e.g., concurrently and/or at different times) to a common set of fuel injectors—the fuel injectors 52. The present disclosure, however, is not limited to such an exemplary arrangement. The aircraft engine 34, for example, may alternatively include a first set of one or more hydrocarbon fuel-fuel injectors and a second set of one or more non-hydrocarbon fuel-fuel injectors, where the hydrocarbon fuel-fuel injectors receive the hydrocarbon fuel from the hydrocarbon fuel system 40, and where the non-hydrocarbon fuel-fuel injectors receive the non-hydrocarbon fuel from the non-hydrocarbon fuel system 42.

The fuel delivery system 26 of FIG. 1 is configured to selectively deliver the hydrocarbon fuel and/or the non-hydrocarbon fuel to the fuel injectors 52 for injection into a combustion volume 64 (or multiple combustion volumes) within the aircraft engine 34. This injected fuel is mixed with air (e.g., compressed air) to provide a fuel-air mixture, and the fuel-air mixture is ignited to generate gaseous combustion products for driving rotation of an internal rotating assembly 66 (or multiple internal rotating assemblies) of the aircraft engine 34. The fuel delivery system 26 thereby selectively delivers the hydrocarbon fuel and/or the non-hydrocarbon fuel to the aircraft engine 34 to power operation of the aircraft engine 34. During one or more modes of operation, the fuel delivery system 26 may deliver both the hydrocarbon fuel and the non-hydrocarbon fuel concurrently to the fuel injectors 52. During one or more other modes of operation, the fuel delivery system 26 may deliver (e.g., only) the hydrocarbon fuel to the fuel injectors 52; e.g., without the non-hydrocarbon fuel. During still one or more other modes of operation, the fuel delivery system 26 may deliver (e.g., only) the non-hydrocarbon fuel to the fuel injectors 52; e.g., without the hydrocarbon fuel.

The controller 28 is in signal communication with (e.g., hardwired and/or wirelessly coupled to) the aircraft engine 34 and the fuel delivery system 26. The controller 28, for example, may be in signal communication with one or more actuators within the aircraft engine 34, the hydrocarbon fuel flow regulator 50 and the non-hydrocarbon fuel flow regulator 60. The controller 28 is configured to signal these (and/or other) elements within the aircraft engine 34 and the fuel delivery system 26 to control operation of the aircraft engine 34 and the fuel delivery system 26. The controller 28, for example, may signal the hydrocarbon fuel flow regulator 50 and/or the non-hydrocarbon fuel flow regulator 60 such that the fuel delivery system 26 selectively delivers the hydrocarbon fuel and/or the non-hydrocarbon fuel to the fuel injectors 52 according to a fuel schedule. Herein, the term "fuel schedule" may describe a schedule for when one or more different fuels (e.g., the hydrocarbon fuel and/or the non-hydrocarbon fuel) should be delivered to an aircraft engine 34 as an aircraft flies (e.g., non-stop) along its flightpath from one location to another location.

The controller 28 is configured as an onboard engine controller such as an electronic engine controller (EEC), an electronic control unit (ECU), a full-authority digital engine controller (FADEC), etc. The controller 28 may be implemented with a combination of hardware and software. The hardware may include memory 68 and at least one processing device 70, which processing device 70 may include one or more single-core and/or multi-core processors. The hardware may also or alternatively include analog and/or digital circuitry other than that described above. The memory 68 is configured to store software (e.g., program instructions) for execution by the processing device, which software execution may control and/or facilitate performance of one or more operations such as those described herein. The memory 68 may be a non-transitory computer readable medium. For example, the memory 68 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The processing system 30 is configured to determine the fuel schedule for the aircraft 22, for example, as described below in further detail. The processing system 30 may then communicate this fuel schedule to the controller 28 electronically. The processing system 30, for example, may be arranged in signal communication with the controller 28, at least while the aircraft 22 is parked at a gate of an airport for example. Alternatively, the processing system 30 may output the fuel schedule to a user (e.g., a pilot, maintenance personnel, etc.), and the user may then input the fuel schedule into the controller 28 manually (or using a memory device). The present disclosure, however, is not limited to the foregoing techniques for communicating the fuel schedule determined by the processing system 30 to the controller 28 for implementation during aircraft operation. Moreover, as described above, it is contemplated the processing system 30 may alternatively be integral with the controller 28 in other embodiments.

The processing system 30 may be implemented with a combination of hardware and software. The hardware may include memory 72 and at least one processing device 74, which processing device 74 may include one or more single-core and/or multi-core processors. The hardware may also or alternatively include analog and/or digital circuitry other than that described above. The memory 72 is configured to store software (e.g., program instructions) for execution by the processing device, which software execution may control and/or facilitate performance of one or more operations such as those described herein. The memory 72 may be a non-transitory computer readable medium. For example, the memory 72 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 2:
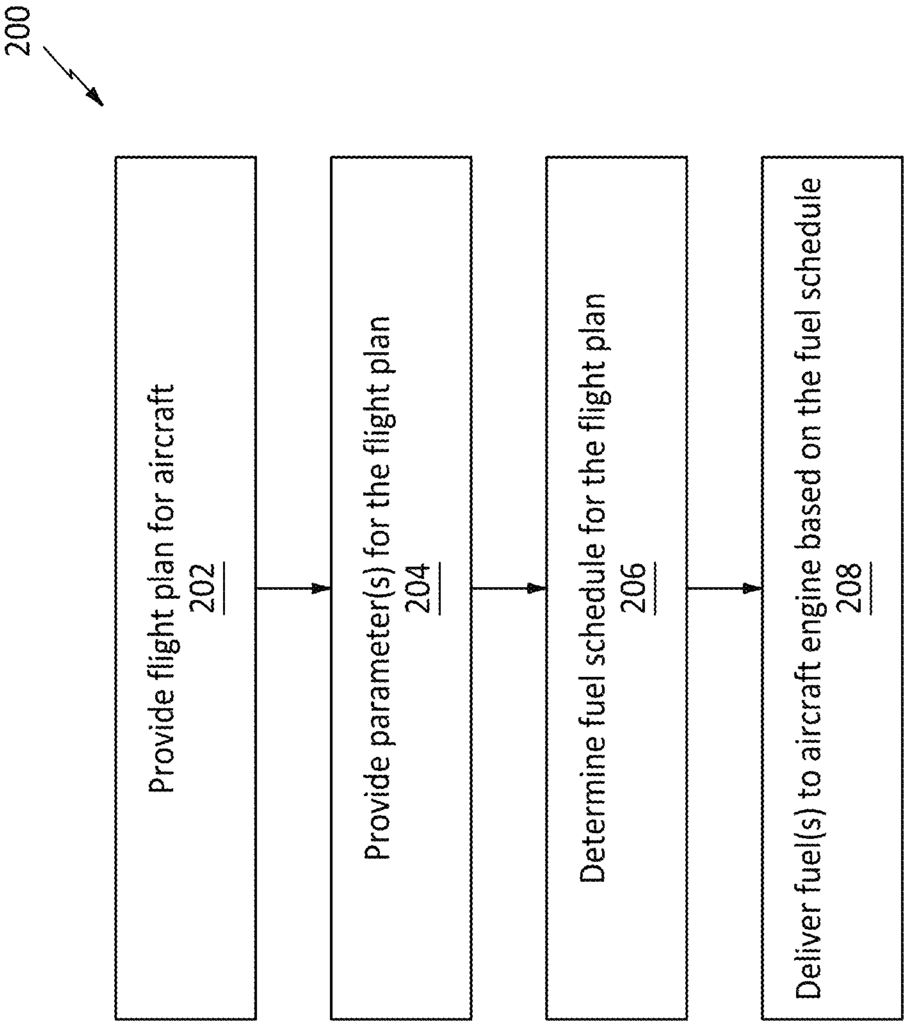
FIG. 2 is a flow diagram of a method for operating an aircraft.

FIG. 2 is a flow diagram of a method 200 for operating an aircraft. For ease of description, the operating method 200 is described below with reference to the aircraft system 20 of FIG. 1. The operating method 200 of the present disclosure, however, is not limited to performance with such an exemplary aircraft system. For example, while the aircraft system 20 is described above with its single aircraft powerplant 24 for ease of description, the operating method 200 may be performed to control operation of multiple of the aircraft powerplants 24 onboard the same aircraft 22. Moreover, for ease of description, the aircraft 22 may be described below as flying from airport to airport. Herein, the term "airport" may be used generically to describe any suitable location at which the aircraft 22 may takeoff and/or land. These takeoff/landing locations include, but are not limited to, a traditional private, commercial and/or government airport as well as makeshift landing strips and/or pads.

In step 202, a flight plan is provided for the aircraft 22. Data indicative of the flight plan, for example, may be manually or electronically input into the processing system 30. Alternatively, the flight plan may be developed using the processing system 30.

Figure 3:
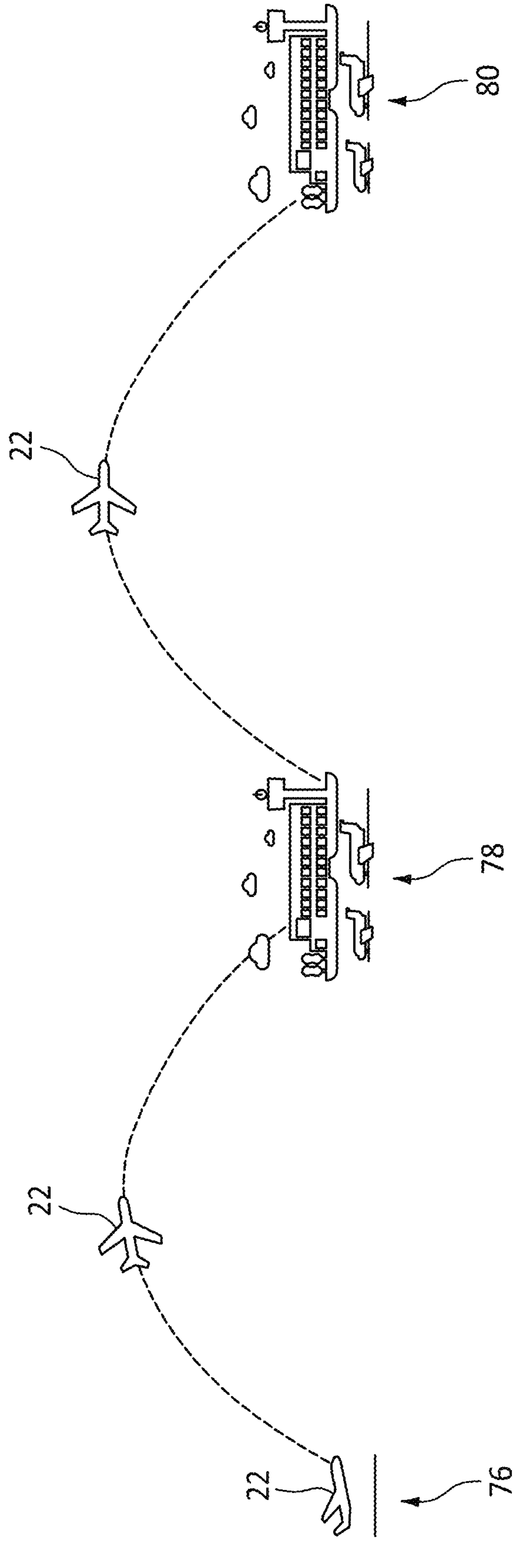
FIG. 3 is a schematic illustration of a flight plan for an aircraft.

Referring to FIG. 3, the flight plan may schedule the aircraft 22 to take a first non-stop flight along a first flightpath from a first airport 76 at a first location to a second airport 78 at a second location. The flight plan may also schedule the aircraft 22 to take a second non-stop flight along a second flightpath from the second airport 78 to a third airport 80 at a third location. For ease of description, the third airport 80 is described herein as a different airport than the first airport 76. However, it is contemplated the third airport 80 may alternatively be the same airport as the first airport 76 where, for example, the flight plan schedules the aircraft 22 to take a round-trip flight between the first and the second airports 76 and 78.

In step 204, one or more parameters are provided for the flight plan. These flight plan parameters may be manually or electronically input into the processing system 30. Alternatively, the flight plan parameters may be stored in a database in the memory 72 of the processing system 30, and the processing system 30 may recall these flight plan parameters based on the flight plan. Examples of the flight plan parameters include, but are not limited to:

- refueling capabilities at one or more airports in the flight plan;
- emissions (e.g., NOx emissions) standards for one or more airspaces along the flightpaths in the flight plan;
- a takeoff weight of the aircraft 22 (estimated and/or actual) from one or more airports in the flight plan; and
- a maximum landing weight assigned to the aircraft 22.

In step 206, the fuel schedule is determined for the flight plan. The processing system 30, for example, may determine the fuel schedule for the flight plan based on at least (or only) one or more of the foregoing flight plan parameters. This fuel schedule may be provided to: maximize use of available refueling infrastructure at the airports 76, 78 and 80 in the flight plan; meet maximum landing weight requirements for the aircraft 22; and/or meet emissions standards for airspaces along the flightpaths in the flight plan.

Figure 4:
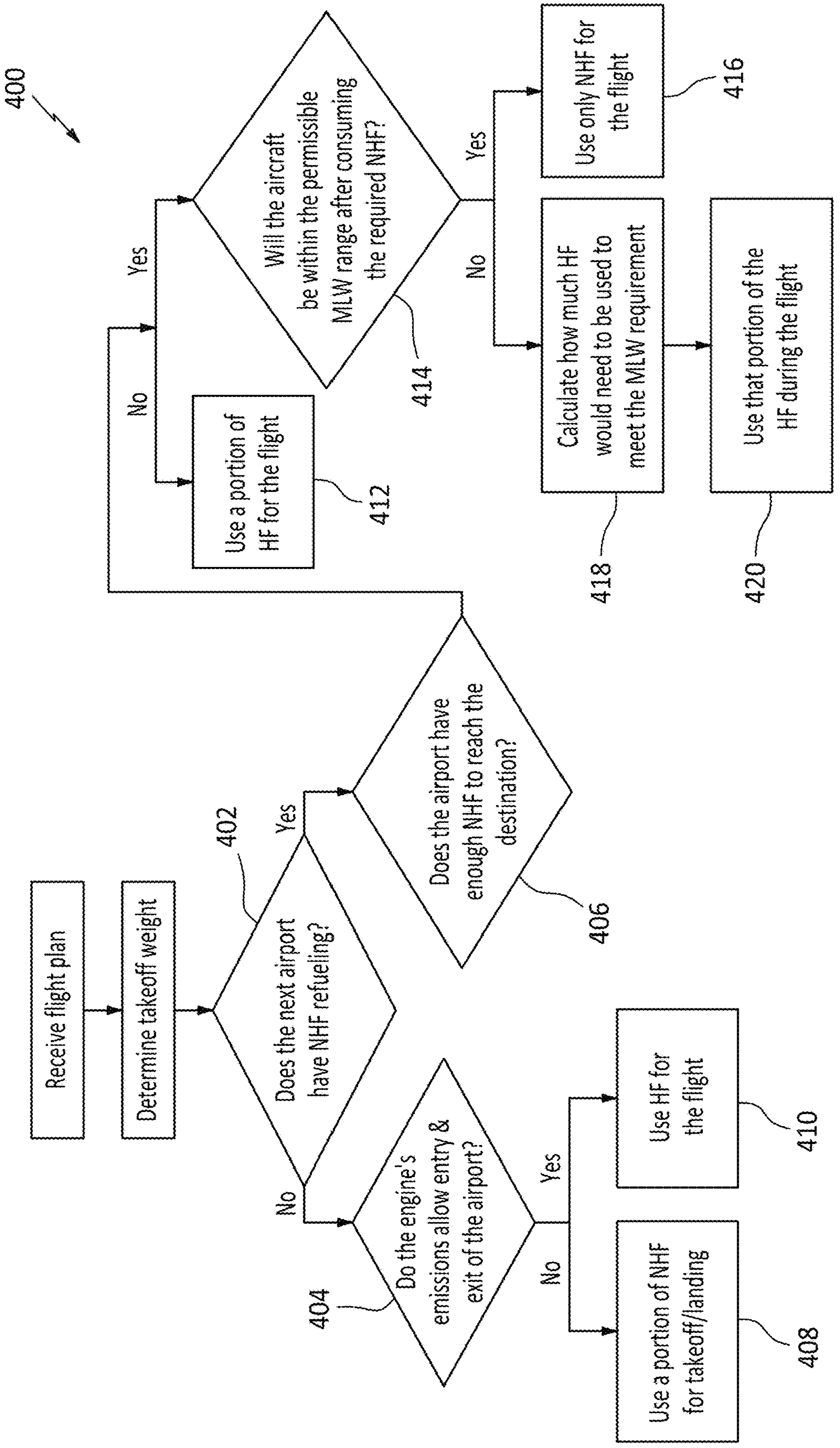
FIG. 4 is a flow diagram of a method for determining a fuel schedule for an aircraft.

FIG. 4 is a flow diagram of a method 400 which may be performed by the processing system 30 for determining the fuel schedule. For ease of description, this fuel schedule determination method 400 is described below for determining a portion of the fuel schedule associated with one leg of the flight plan. More particularly, the fuel schedule determination method 400 is described below for determining a portion of the fuel schedule associated with the flight from the first airport 76 to the second airport 78. This fuel schedule determination method 400, of course, may be repeated to determine an additional portion (or portions) of the fuel schedule associated with an additional leg (or legs) of the flight plan; e.g., the flight from the second airport 78 to the third airport 80. Also for ease of description, it is assumed the aircraft 22 is fully fueled at the first airport 76; e.g., while the aircraft 22 is parked at an aircraft gate. More particularly, it is assumed the hydrocarbon fuel reservoir 48 is (e.g., completely or substantially) filled with the hydrocarbon fuel (HF), and the non-hydrocarbon fuel reservoir 58 is (e.g., completely or substantially) filled with the non-hydrocarbon fuel (NHF) while the aircraft 22 is at the first airport 76 prior to takeoff. It is contemplated, of course, the fuel schedule determination method 400 may alternatively be performed for circumstances where the aircraft 22 is partially filled (or empty of) one or more of the hydrocarbon and non-hydrocarbon fuels.

In step 402, the processing system 30 determines if the second airport 78 includes a refueling capability for the non-hydrocarbon fuel. Of course, this may also be done for the hydrocarbon fuel as well. If no, then the fuel schedule determination method 400 may proceed to step 404. If yes, then the fuel schedule determination method 400 may proceed to step 406.

In the step 404, the processing system 30 determines whether emissions output from the aircraft engine 34 when operating on one or both of the hydrocarbon and non-hydrocarbon fuels meet emissions standards associated with the first airport 76 and/or the second airport 78. For example, the processing system 30 may determine whether or not the emissions output from the aircraft engine 34 operating on the hydrocarbon fuel alone (or operating on a combination of both the hydrocarbon and non-hydrocarbon fuels) meets the emissions standard(s) for an airspace at the first airport 76 and/or an airspace at the second airport 78. If no (see step 408), then the processing system 30 may tailor the fuel schedule to use both the hydrocarbon fuel and the non-hydrocarbon fuel. For example, the fuel schedule may be tailored such that the aircraft engine 34 runs on the non-hydrocarbon fuel while taking off from the first airport 76 and/or landing at the second airport 78 in order to meet the associated emissions standard(s). Otherwise, while the aircraft 22 is flying through one or more airspaces between the first airport airspace and the second airport airspace, the fuel schedule may be tailored such that the aircraft engine 34 runs on the hydrocarbon, for example to preserve as much of the non-hydrocarbon fuel as possible in the non-hydrocarbon fuel reservoir 58 since the second airport 78 does not include a non-hydrocarbon fuel refueling capability in this example. By contrast, if yes (see step 410), then the processing system 30 may tailor the fuel schedule to (e.g., only) use the hydrocarbon fuel.

While the step 404 is described above concentrating on emissions standard(s) for the air spaces at the first airport 76 and the second airport 78, the present disclosure is not limited thereto. For example, the step 404 may also or alternatively tailor the fuel schedule based on emissions standard(s) for one or more intermediate air spaces along the flight path between the first airport air space and the second airport air space.

In the step 406, the processing system 30 determines if the aircraft 22 has enough of the non-hydrocarbon fuel to reach the second airport 78. For example, the processing system 30 may determine a range of the aircraft 22 if the aircraft engine 34 runs on the non-hydrocarbon fuel alone. The processing system 30 then compares this range to a distance the aircraft 22 will travel along the flightpath from the first airport 76 to the second airport 78. If the range is less than the distance (see step 412), the fuel schedule may be tailored to use both the hydrocarbon fuel and the non-hydrocarbon fuel. Here, the fuel schedule may be tailored such that all or substantially all of the non-hydrocarbon fuel is provided to the aircraft engine 34 during the flight from the first airport 76 to the second airport 78. In other words, the fuel schedule may be tailored such that as little of the hydrocarbon fuel as possible is used while ensuring a complete flight from the first airport 76 to the second airport 78. By contrast, if the range is equal to or greater than the distance, then the fuel schedule determination method 400 may proceed to step 414.

In the step 414, the processing system 30 determines if the aircraft 22 will have a permissible landing weight at the second airport 78. For example, the processing system 30 may predict a landing weight of the aircraft 22 at the second airport 78 if the aircraft engine 34 is run on the non-hydrocarbon fuel alone. The processing system 30 then compares this predicted landing weight to the maximum landing weight for the aircraft 22. If the predicted landing weight is equal to or less than the maximum landing weight (see step 416), the fuel schedule may be tailored to use (e.g., only) the non-hydrocarbon fuel without (e.g., any of) the hydrocarbon fuel. By contrast, if the predicted landing weight is greater than the maximum landing weight (see steps 418 and 420), the fuel schedule may be tailored to use both the hydrocarbon fuel and the non-hydrocarbon fuel. For example, the fuel schedule may be tailored such that enough of the (e.g., heavier, denser) hydrocarbon fuel is used during flight to lower the predicted landing weight to or below the maximum landing weight. In other words, the fuel schedule may be tailored such that as little of the hydrocarbon fuel as possible is used while ensuring requirements associated with the maximum landing weight are met.

Referring again to FIG. 2, in step 208, the fuel delivery system 26 delivers the hydrocarbon fuel and/or the non-hydrocarbon fuel to the aircraft engine 34 according to the fuel schedule. The processing system 30, for example, may communicate the fuel schedule to the controller 28. The controller 28 may then implement the fuel schedule during aircraft flight by providing control signals to the fuel delivery system 26.

Figure 5:
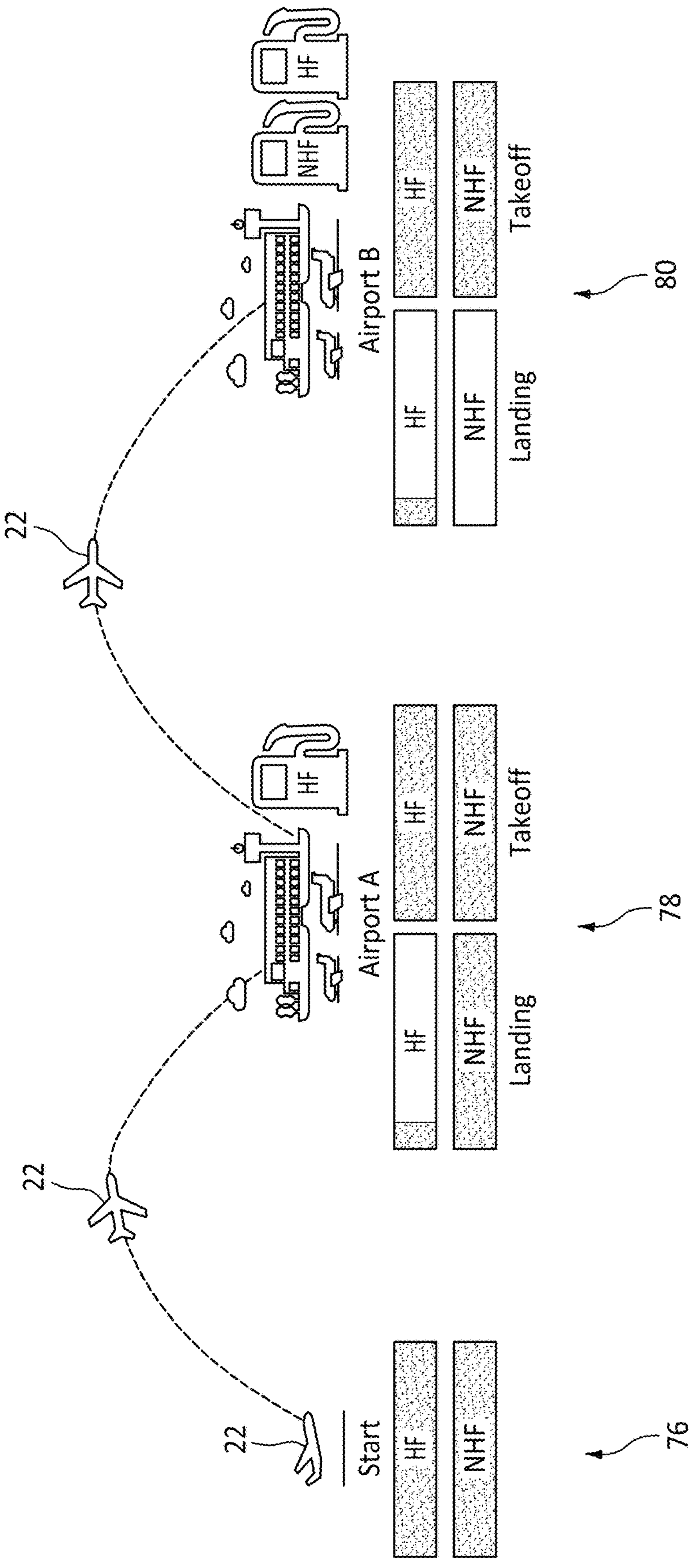
FIG. 5 is a schematic illustration of a flight plan for an aircraft with various refueling capabilities at various airports.

In some embodiments, referring to FIG. 5, the first airport 76 may include a refueling capability for both the hydrocarbon fuel and the non-hydrocarbon fuel. The second airport 78 may include a refueling capability for the hydrocarbon fuel, but not the non-hydrocarbon fuel. The third airport 80 may include a refueling capability for both the hydrocarbon fuel and the non-hydrocarbon fuel. A distance the aircraft 22 will travel along the first flightpath from the first airport 76 to the second airport 78 may be equal to or less than a range for operating aircraft engine 34 on the hydrocarbon fuel alone. However, a distance the aircraft 22 will travel along the second flightpath from the second airport 78 to the third airport 80 may be greater than the range for operating aircraft engine 34 on the hydrocarbon fuel alone. Under such conditions, the processing system 30 may tailor the fuel schedule to use the hydrocarbon fuel (without the non-hydrocarbon fuel) during the flight from the first airport 76 to the second airport 78. The processing system 30 may further tailor the fuel schedule to use both the hydrocarbon fuel and the non-hydrocarbon fuel during the flight from the second airport 78 to the third airport 80. In other words, the processing system 30 may recognize that the aircraft 22 cannot be refueled with the non-hydrocarbon fuel at the second airport 78, and that an available (e.g., full) supply of the hydrocarbon fuel alone will not be enough to make the flight from the second airport 78 to the third airport 80.

In some embodiments, where the aircraft 22 is predicted to remain on ground at a particular destination airport (e.g., for service, extended storage, etc.) for a period time greater than a threshold (e.g., a day, a week, a month, etc.), the processing system 30 may tailor the fuel schedule such that the aircraft engine 34 consumes all or substantially all of the non-hydrocarbon fuel during the flight to that destination airport. This will thereby diminish or obviate evaporation, potential boiloff and/or other degradation of the non-hydrocarbon fuel while the aircraft 22 is grounded.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for operating an aircraft, comprising:

receiving, by a processing system, a flight plan for an aircraft, the flight plan scheduling a flight for the aircraft to fly from a first airport to a second airport, the aircraft including an engine and a fuel delivery system with a first fuel reservoir and a second fuel reservoir, and the fuel delivery system configured to selectively deliver at least one of a first fuel from the first fuel reservoir or a second fuel from the second fuel reservoir to the engine for combustion, wherein the first fuel reservoir contains a quantity of the first fuel and the second fuel reservoir contains a quantity of the second fuel at the first airport;

determining, by the processing system, a fuel schedule for the aircraft to use during the flight, the fuel schedule determined based on whether the second airport includes refueling capability for at least one of the first fuel or the second fuel, the fuel schedule describing when, along a flightpath, at least one of the first fuel or the second fuel is delivered to the engine; and communicating the fuel schedule from the processing system, to a controller of the aircraft, for implementation of the fuel schedule by the controller to selectively deliver the at least one of the first fuel or the second fuel to the engine during the flight via control signals to the fuel delivery system.

2. The method of claim 1, wherein one of the first fuel or the second fuel comprises a hydrocarbon fuel; and the other one of the first fuel or the second fuel comprises a non-hydrocarbon fuel.

3. The method of claim 1, wherein one of the first fuel or the second fuel comprises a kerosene fuel.

4. The method of claim 1, wherein one of the first fuel or the second fuel comprises a hydrogen ($H_2$) fuel.

5. The method of claim 1, wherein one of the first fuel or the second fuel comprises sustainable aviation fuel.

6. The method of claim 1, wherein the fuel schedule schedules use of the first fuel during the flight where the second airport does not include the refueling capability for the second fuel.

7. The method of claim 6, wherein the fuel schedule schedules no use of the second fuel during the flight.

8. The method of claim 6, wherein the flight plan identifies the flightpath for the aircraft to follow during the flight from the first airport to the second airport;

the fuel schedule is further determined based on an emissions standard for an airspace along the flightpath; and the fuel schedule further schedules use of the second fuel during the flight through the airspace where operation of the engine using the first fuel does not meet the emissions standard for the airspace and operation of the engine using the second fuel does meet the emissions standard for the airspace.

9. The method of claim 8, wherein the airspace is an airspace at the first airport or the second airport.

10. The method of claim 8, wherein the airspace is an intermediate airspace located along the flightpath between a first airport airspace at the first airport and a second airport airspace at the second airport.

11. The method of claim 6, wherein the second fuel comprises a non-hydrocarbon fuel or a sustainable aviation fuel.

12. The method of claim 1, wherein the first fuel comprises a kerosene fuel;

the second fuel comprises a non-hydrocarbon fuel or a sustainable aviation fuel; and the fuel schedule schedules use of the second fuel during the flight where the second airport includes the refueling capability for both the first fuel and the second fuel.

13. The method of claim 12, wherein the fuel schedule schedules no use of the first fuel during the flight.

14. The method of claim 12, wherein the fuel schedule further schedules use of the first fuel during the flight where a range for operating the engine on the second fuel contained within the second fuel reservoir at the first airport is less than a distance the aircraft travels during the flight.

15. The method of claim 12, wherein the first fuel has a first density;

the second fuel has a second density that is less than the first density; and the fuel schedule further schedules use of the first fuel during the flight where a weight of the aircraft during landing at the second airport is predicted to be greater than a maximum landing weight of the aircraft if the engine was fueled only with the second fuel during the flight.

16. The method of claim 1, wherein the first fuel comprises a kerosene fuel;

the second fuel comprises a non-hydrocarbon fuel; and the fuel schedule schedules use of one of (a) only the second fuel or (b) all of the second fuel and some of the first fuel during the flight where the aircraft is scheduled to remain on ground at the second airport for a period of time equal to or greater than a threshold.

17. The method of claim 1, wherein the processing system is off-board the aircraft.

18. The method of claim 1, wherein the processing system is onboard the aircraft.

19. A method for operating an aircraft, comprising:

receiving, by a processing system, a flight plan for an aircraft, the flight plan scheduling a flight for the aircraft to fly non-stop from a first airport to a second airport, the aircraft including a fuel delivery system and an engine, the fuel delivery system including a first fuel reservoir and a second fuel reservoir, and the fuel delivery system configured to selectively deliver at least one of a first fuel from the first fuel reservoir or a second fuel from the second fuel reservoir to the engine for combustion, wherein the first fuel has a first density, and the second fuel has a second density that is less than the first density; and determining, by the processing system, a fuel schedule for the aircraft to use during the flight, the fuel schedule determined based on a maximum landing weight of the aircraft, the fuel schedule describing when, along a flightpath, at least one of the first fuel or the second fuel is delivered to the engine;

communicating the fuel schedule from the processing system, to a controller of the aircraft, for implementation of the fuel schedule by the controller to selectively deliver the at least one of the first fuel or the second fuel to the engine during the flight via control signals to the fuel delivery system;

wherein, when a predicted weight of the aircraft during landing at the second airport following use of the second fuel without the first fuel during the flight is equal to or less than the maximum landing weight, the fuel schedule schedules use of the second fuel without the first fuel during the flight; and wherein, when the predicted weight of the aircraft during the landing at the second airport following use of the second fuel without the first fuel during the flight is greater than the maximum landing weight, the fuel schedule schedules use of the second fuel and the first fuel during the flight.

20. A system for an aircraft, comprising:

an aircraft engine;

a fuel delivery system including a first fuel reservoir and a second fuel reservoir, the fuel delivery system configured to selectively deliver at least one of a first fuel from the first fuel reservoir or a second fuel from the second fuel reservoir to the engine for combustion;

a processing system configured to determine a fuel schedule for the aircraft to use during a flight from a first airport to a second airport where the first fuel reservoir contains a quantity of the first fuel and the second fuel reservoir contains a quantity of the second fuel at the first airport, and communicate the fuel schedule to a controller, wherein the processing system determines the fuel schedule based on whether the second airport includes refueling capability for at least one of the first fuel or the second fuel, and the fuel schedule describes when, along a flightpath, at least one of the first fuel or the second fuel is delivered to the engine; and the controller configured to implement the fuel schedule by selectively delivering the at least one of the first fuel or the second fuel to the engine during the flight via control signals to the fuel delivery system.

* * * * *